US010783218B2

(12) United States Patent
Yoshizawa et al.

(10) Patent No.: US 10,783,218 B2
(45) Date of Patent: Sep. 22, 2020

(54) VARIABLE GROUP CALCULATION APPARATUS, VARIABLE GROUP CALCULATION METHOD, VARIABLE GROUP CALCULATION PROGRAM, AND DATA STRUCTURE

(71) Applicant: TOYOTA JIDOSHA KABUSHIKI KAISHA, Toyota-shi (JP)

(72) Inventors: Shintaro Yoshizawa, Nagoya (JP); Norimasa Kobori, Nakano-ku (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/988,162

(22) Filed: May 24, 2018

(65) Prior Publication Data

US 2018/0349318 A1 Dec. 6, 2018

(30) Foreign Application Priority Data

May 30, 2017 (JP) .................................. 2017-107122

(51) Int. Cl.
*G06F 17/10* (2006.01)
*G06N 20/00* (2019.01)
(Continued)

(52) U.S. Cl.
CPC ............ *G06F 17/153* (2013.01); *G06F 17/10* (2013.01); *G06F 17/175* (2013.01); *G06F 17/18* (2013.01); *G06N 20/00* (2019.01)

(58) Field of Classification Search
CPC ................................. G06F 17/10; G06F 17/11
See application file for complete search history.

(56) References Cited

U.S. PATENT DOCUMENTS

2008/0197842 A1* 8/2008 Lustig ................. G01R 33/561
324/307
2010/0091131 A1 4/2010 Furukawa
(Continued)

FOREIGN PATENT DOCUMENTS

| JP | 2009-53926 | 3/2009 |
| JP | 2017-33172 | 2/2017 |
| JP | 6080783 | 2/2017 |

OTHER PUBLICATIONS

Ivan Selesnick, "Sparsity-Assisted Signal Smoothing (Revisited)" IEEE, International Conference on Acoustics Speech and signal Processing (ICASSP), Mar. 5, 2017, pp. 4546-4550.

*Primary Examiner* — Chuong D Ngo
(74) *Attorney, Agent, or Firm* — Oblon, McClelland, Maier & Neustadt, L.L.P.

(57) ABSTRACT

The present disclosure is applied to a variable group calculation apparatus for calculating an undetermined variable group that simultaneously minimizes a difference value and a data value. The difference value is a difference between an added composite value, which is obtained by adding and combining the undetermined variable group and a dictionary data group, and an observation data group. The data value includes the difference value and a regularization term of the undetermined variable group. The variable group calculation apparatus of the present disclosure includes a convolution unit configured to convert the regularization term to a convolution value for an L1 norm using the undetermined variable group and a mollifier function, and a calculation unit configured to perform the calculation using the regularization term, which is converted to the convolution value by the convolution unit.

12 Claims, 6 Drawing Sheets

(51) Int. Cl.
*G06F 17/15* (2006.01)
*G06F 17/17* (2006.01)
*G06F 17/18* (2006.01)

(56) References Cited

U.S. PATENT DOCUMENTS

| | | |
|---|---|---|
| 2014/0266869 A1 | 9/2014 | Liu et al. |
| 2016/0260030 A1* | 9/2016 | He ................... G06F 17/18 |
| 2018/0014130 A1* | 1/2018 | Lunner ............. A61F 11/06 |
| 2018/0174028 A1* | 6/2018 | Lin .................. G06N 3/063 |

* cited by examiner

VARIABLE GROUP CALCULATION APPARATUS, VARIABLE GROUP CALCULATION METHOD, VARIABLE GROUP CALCULATION PROGRAM, AND DATA STRUCTURE

CROSS REFERENCE TO RELATED APPLICATIONS

This application is based upon and claims the benefit of priority from Japanese patent application No. 2017-107122, filed on May 30, 2017, the disclosure of which is incorporated herein in its entirety by reference.

BACKGROUND

The present disclosure relates to a variable group calculation apparatus, a variable group calculation method, a variable group calculation program, and a data structure.

In application of machine learning, high dimensional data such as image data and voice data has a problem in which a result of the learning is affected by unnecessary information included in the data, and thus overfitting is likely to occur.

An effective method for avoiding such a problem is "sparse learning". The sparse learning is a method of learning while deleting information irrelevant to a purpose using low dimensionality (sparseness) of intrinsically significant information included in the data.

In the sparse learning, when a desired high-dimensional observation data group (y) is represented by a linear combination of a dictionary matrix (A), column vectors of the dictionary matrix (A) are in a linear dependence relationship, and unnecessary information is often included in the dictionary matrix (A). Thus, an explanatory variable group functioning to indicate intrinsically significant column components in the dictionary matrix (A) is used as an undetermined variable group (x), which is a main factor for obtaining the observation data group (y).

In order to calculate the undetermined variable group (x) in the sparse learning, it is necessary to solve a minimization problem for calculating the undetermined variable group (x) that minimizes a difference value between an added composite value (Ax), which is obtained by adding and combining the undetermined variable group (x) and the dictionary matrix (A), and the observation data group (y). However, the minimization problem needs further improvement in the calculation accuracy. A representative example of the minimization problem includes a least squares method of calculating the undetermined variable group (x) that minimizes $|y-Ax|^2$.

It is known that in the sparse learning, a constraint (a regularization term $|x|^p$, where p is a constant) that does not increase the undetermined variable group (x) is added to the above minimization problem, and x, which simultaneously decreases (minimizes) the above-mentioned difference value and a data value including the difference value and the regularization term, is calculated, so that the undetermined variable group (x) is accurately calculated.

In the sparse learning, for example, the following technique is known as a technique for adding the regularization term and calculating the undetermined variable group (x).

Japanese Patent No. 6080783 discloses a calculation apparatus that performs the above-described calculation with the regularization term of L0 norm where p=0.

Japanese Unexamined Patent Application Publication No. 2017-033172 discloses a calculation apparatus that performs the above-described calculation with the regularization term of an L1 norm ($|x|$) where p=1 or an L2 norm ($|x|^2$) where p=2.

Ryota Tomioka discloses, in "Machine Learning with Sparsity Inducing Regulations (machine learning professional series)", Kodansha Ltd., December 2015, a calculation apparatus that performs the above-described calculation with the regularization term of an L2 norm ($|x|^2$) where p=2.

SUMMARY

However, when the regularization term has p=0, it is practically a problem of combining the undetermined variable groups in the minimization problem. Thus, a large amount of data pieces in the observation data groups leads to a problem of insufficient calculation speed.

When the regularization term has p=1, the regularization term includes many non-consecutive parts that cannot be differentiated. For this reason, complicated branching conditions need to be included in the calculation process of the minimization problem, leading to a problem that the calculation of the minimization problem needs further improvement.

When the regularization term has p=2 or greater, the regularization term is a continuous function, which is easy to differentiate, hence it is expected that the calculation speed can be faster than when p=0 and p=1. However, such a case has a trade-off problem in which the undetermined variable to be a main factor is difficult to be identified because the number of undetermined variable groups obtained as results of the calculation tends to be large.

In light of this problem, in the sparse learning, a variable group calculation apparatus that achieves a high calculation speed and can easily identify the undetermined variable group is desired as the variable group calculation apparatus that adds the regularization term and calculates the undetermined variable group.

The present disclosure has been made in view of the above problem. The present disclosure provides a variable group calculation apparatus, a variable group calculation method, a variable group calculation program, and a data structure that achieve a high calculation speed and can easily identify the undetermined variable group as the main factor.

An example aspect of the present disclosure is a variable group calculation apparatus for calculating an undetermined variable group that simultaneously minimizes a difference value and a data value. The difference value is a difference between an added composite value, which is obtained by adding and combining the undetermined variable group and a dictionary data group, and an observation data group. The data value includes the difference value and a regularization term of the undetermined variable group. The variable group calculation apparatus includes:

a convolution unit configured to convert the regularization term to a convolution value for an L1 norm using the undetermined variable group and a mollifier function; and a calculation unit configured to perform the calculation using the regularization term, which is converted to the convolution value by the convolution unit.

Another example aspect of the present disclosure is a variable group calculation method by a variable group calculation apparatus for calculating an undetermined variable group that simultaneously minimizes a difference value and a data value. The difference value is a difference between an added composite value, which is obtained by adding and combining the undetermined variable group and a dictionary data group, and an observation data group. The data value includes the difference value and a regularization term of the undetermined variable group. The variable group calculation method includes:

converting the regularization term to a convolution value for an L1 norm using the undetermined variable group and a mollifier function; and performing the calculation using the regularization term, which is converted to the convolution value.

Another example aspect of the present disclosure is a variable group calculation program for causing a computer, which calculates an undetermined variable group that simultaneously minimizes a difference value and a data value, the difference value being a difference between an added composite value, which is obtained by adding and combining the undetermined variable group and a dictionary data group, and an observation data group, and the data value including the difference value and a regularization term of the undetermined variable group, to execute:

converting the regularization term to a convolution value for an L1 norm using the undetermined variable group and a mollifier function; and performing the calculation using the regularization term, which is converted to the convolution value.

Another example aspect of the present disclosure is a data structure used by a variable group calculation apparatus. The data structure includes:

a difference value between an added composite value, which is obtained by adding and combining an undetermined variable group and a dictionary data group, and an observation data group; and a regularization term of the undetermined variable group, the regularization term being a convolution value for an L1 norm using the undetermined variable group and a mollifier function.

The data structure is used by the variable group calculation apparatus in order to calculate the undetermined variable group that simultaneously minimizes the difference value and a data value including the difference value and the regularization term.

According to the respective example aspects of the present disclosure, it is possible to provide a variable group calculation apparatus, a variable group calculation method, a variable group calculation program, and a data structure that achieve a high calculation speed and can easily identify an undetermined variable group as a main factor.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, a specific embodiment will be described in detail with reference to the drawings. The same or corresponding elements are denoted by the same signs throughout the drawings, and repeated descriptions will be omitted as necessary for the sake of clarity.

Outline of this Embodiment

First, an outline of this embodiment will be described.

Figure 1:
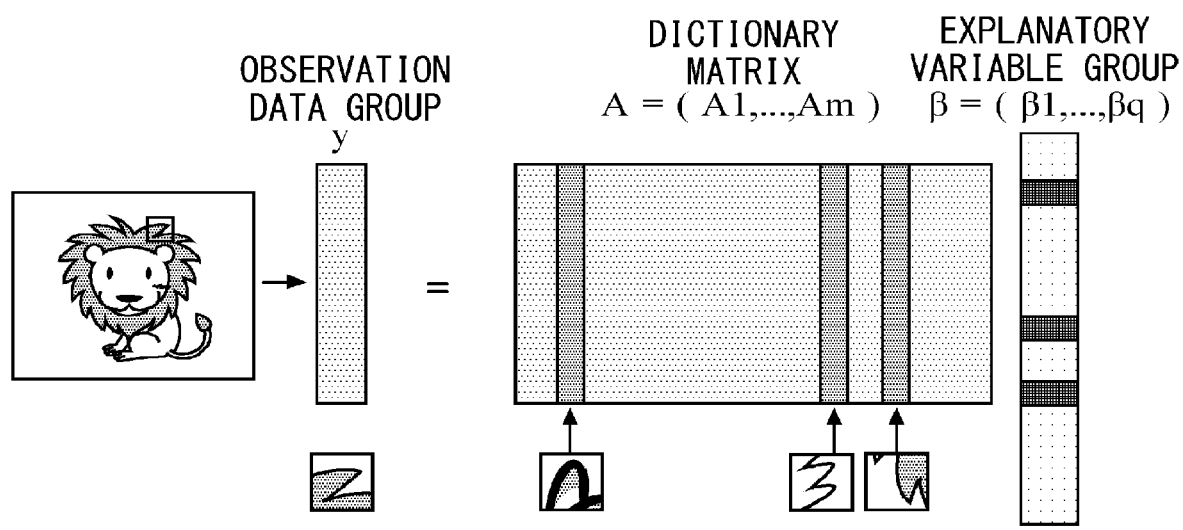
FIG. 1 is a diagram showing an example of an observation data group.

FIG. 1 is a diagram showing an example of an observation data group (y) according to this embodiment. As shown in FIG. 1, in this embodiment, image data is handled as the observation data group (y). The image data shown in FIG. 1 is an example, and the image data is not limited to this.

The observation data group (y) is expressed by the following equation (1), where β represents an explanatory variable group, which is an example of the undetermined variable group to be a main factor for obtaining the observation data group (y), and A represents a dictionary matrix, which is an example of a dictionary data group.

$$y = A \cdot \beta \quad (1)$$

Here, $A=(A_1, \ldots, A_m)$, and $\beta=(\beta_1, \ldots, \beta_q)$. Further, m and q are constants.

Incidentally, the actual observation data group (y) relatively often has a structure (a sparse structure) in which the explanatory variable group (β) actually affecting the observation data group (y) is sparsely present. For example, in the image data, colors of adjacent pixels are mostly similar colors. When the pixels having similar colors are put together well, the information of the image data can be largely compressed.

In the sparse learning, although the observation data group (y) itself is large, it is used when there are only a few explanatory variables ($\beta_j$) (j is a positive integer where $1 \leq j \leq q$) actually affecting the observation data group (y). In the sparse learning, a huge number of explanatory variable groups (β) is prepared, and the explanatory variable ($\beta_j$) not affecting the observation data group (y) within the explanatory variable groups (β) is estimated to be "0". For example, in FIG. 1, when the explanatory variable ($\beta_1$) constituting the explanatory variable group (β) is a variable not affecting the observation data group (y), the explanatory variable ($\beta_1$) is estimated to be "0".

In the sparse learning, the regularization term of the explanatory variable group (β) is added to the minimization problem for minimizing the difference value between the added composite value (Ax), which is obtained by adding and combining the undetermined variable group (x) and the dictionary matrix (A), and the observation data group (y). Further, the explanatory variable group (β) for simultaneously minimizing the above difference value and the data value including the above difference value and the regularization term is calculated. It is known that by doing so, the explanatory variable group can be accurately calculated.

In the sparse learning, a cost function R(β) when the regularization term is added and the explanatory variable group (β) is calculated is expressed by, for example, the following equation (2).

$$R(\beta) = f(\beta) + \varphi(\beta) \quad (2)$$

In this equation, f(β) represents a loss function, and Ψ(β) represents a regularization term. In this embodiment, the loss function f(β) is expressed by, for example, the following equation (3).

$$f(\beta) = \|y - A \cdot \beta\|2 \quad (3)$$

In addition, the regularization term Ψ(β) is typically expressed as an L1 norm, for example, by the following equation (4).

$$\varphi(\beta) = \lambda \Sigma_{j-1}^{q} |\beta_j| \quad (4)$$

In this equation, λ represents a regularization variable. The regularization term Ψ(β) expressed by the equation (4) is a product of the sum of the absolute values of the explanatory variables ($\beta_j$) and the regularization variable λ. The sparse learning of the type in which the regularization term Ψ(β) is expressed by the equation (4) is referred to as LASSO (Least Absolute Shrinkage and Selection Operator).

In the minimization problem expressed as above, the explanatory variable group (β) that simultaneously minimizes the loss function f(β) and the cost function R(β) is calculated. The loss function f(β) corresponds to the difference value between the added composite value (Ax), which is obtained by adding and combining the explanatory variable group (β) and the dictionary matrix (A), and the observation data group (y). The cost function R(β) corresponds to the data value including the loss function f(β) and the regularization term Ψ(β).

Here, when the regularization term Ψ(β) is a regularization term of the L1 norm like the equation (4) (hereinafter, the regularization term of the L1 norm is appropriately referred to as an L1 regularization term), it is easy to narrow down the explanatory variable group (β), which is an advantage.

Furthermore, if Newton's method or its variations can be applied to the calculation of the explanatory variable group (β), it is expected the calculation speed could be improved because Newton's method is quadratic convergence and has a higher speed of convergence to a solution compared with the linear convergence and the superlinear convergence.

However, when the waveform of the L1 regularization term Ψ(β) is sharp, Ψ(β) cannot be differentiated, hence Newton's method or its variations cannot be applied to the calculation of the above explanatory variable group (β). Thus, the calculation speed cannot be improved.

On the other hand, the waveform of the loss function f(β) is often smooth.

Thus, in this embodiment, the L1 regularization term Ψ(β) becomes a smoothed convex function, so that the entire cost function R(β) becomes a smoothed convex function. By doing so, Newton's method or its variations can be applied while making full use of the characteristics of the L1 regularization term that enables the explanatory variable group (β) to be easily narrowed down. This improves the calculation speed of the explanatory variable group (β).

Configuration of this Embodiment

Next, a configuration of this embodiment will be described.

Figure 2:
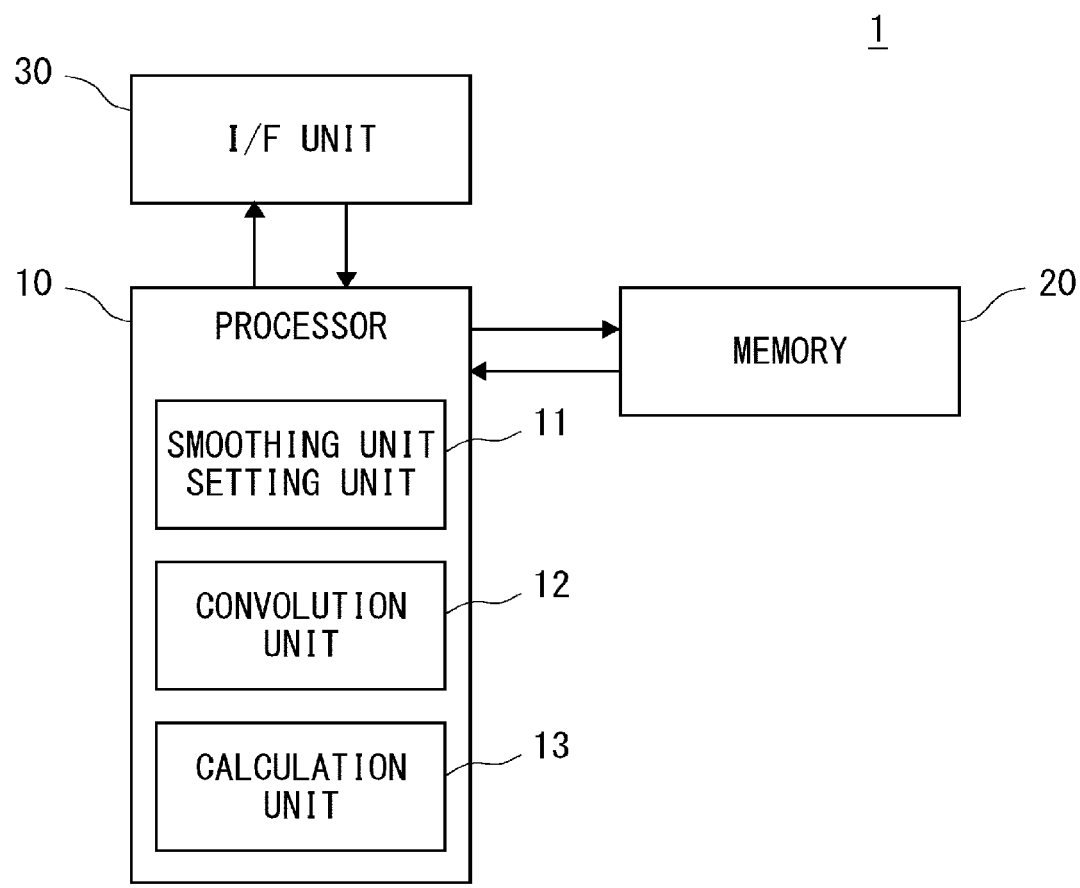
FIG. 2 is a block diagram showing a configuration example of a variable group calculation apparatus according to an embodiment.

FIG. 2 is a block diagram showing a configuration example of the variable group calculation apparatus 1 according to this embodiment. As shown in FIG. 2, a hardware configuration of the variable group calculation apparatus 1 according to this embodiment includes a processor 10, a memory 20, and an interface (I/F) unit 30. The processor 10 includes a smoothing unit setting unit 11, a convolution unit 12, and a calculation unit 13.

The memory 20 stores a program (a calculation program) including instructions to be executed by the processor 10. The memory 20 is, for example, a volatile memory, a non-volatile memory, or a combination thereof.

The interface (I/F) unit 30 inputs and outputs various information items from and to the outside.

The processor 10 reads the program including the instructions from the memory 20 and executes it to thereby achieve the functions of the smoothing unit setting unit 11, the convolution unit 12, and the calculation unit 13. The smoothing unit setting unit 11, the convolution unit 12, and the calculation unit 13 will be described later in detail. The processor 10 is a CPU (Central Processing Unit), an MPU (Micro Processing Unit), a microprocessor, a combination thereof, or the like.

The above-mentioned program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Compact Disk-Read Only Memory), CD-R (CD-recordable), CD-R/W (CD-rewritable), and semiconductor memories (such as mask ROM, PROM (Programmable ROM), EPROM (Erasable PROM), flash ROM, RAM (Random Access Memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Operation of this Embodiment

Next, an operation of this embodiment will be described.

Figure 3:
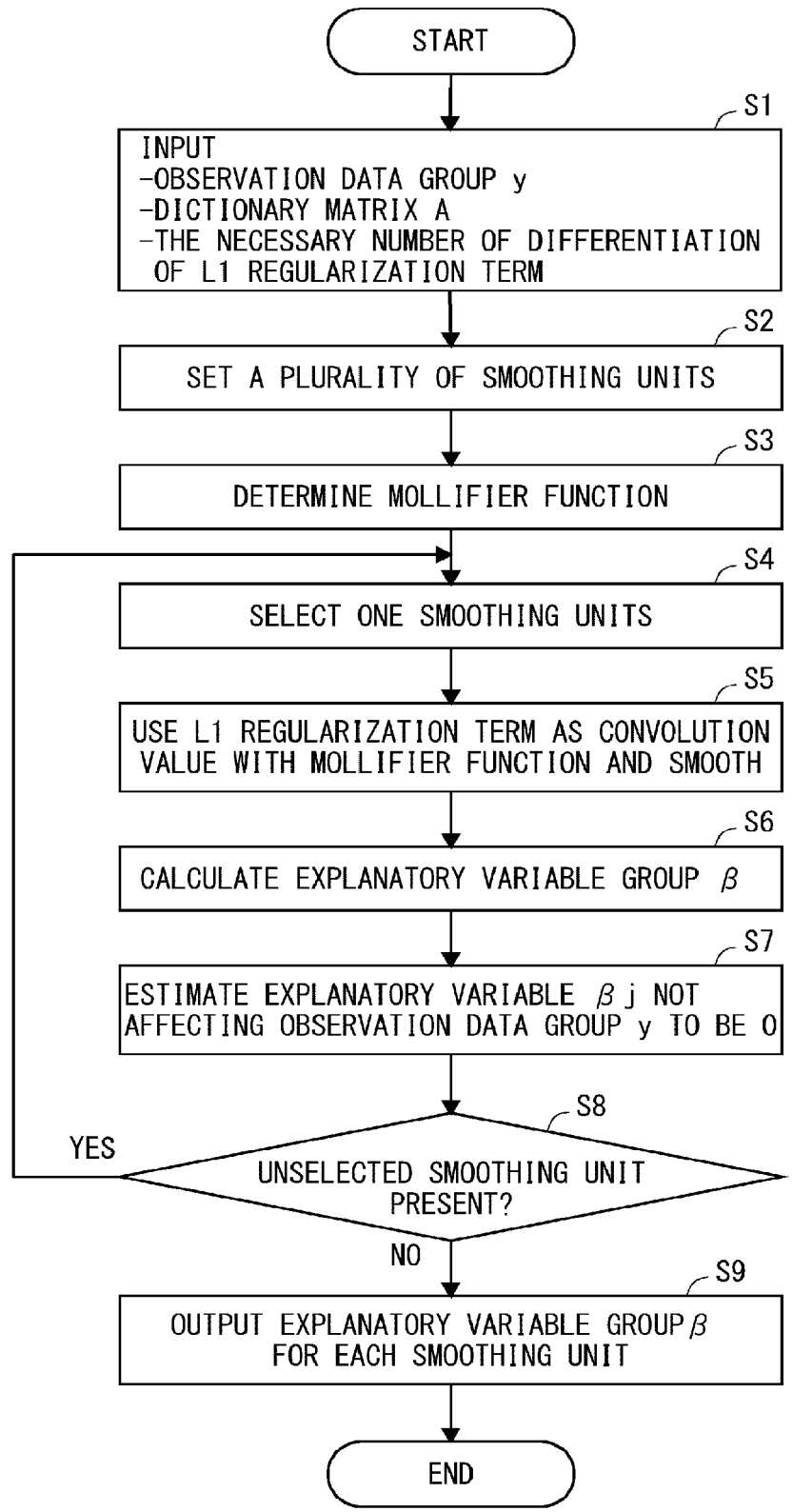
FIG. 3 is a flowchart describing an example of a flow of a variable group calculation method performed by the variable group calculation apparatus according to the embodiment.

FIG. 3 is a flowchart illustrating an example of a flow of a variable group calculation method performed by the variable group calculation apparatus 1 according to this embodiment.

As shown in FIG. 3, firstly, the observation data group (y), the dictionary matrix (A), and information about the necessary number of differentiation of the L1 regularization term are input from outside to the interface (I/F) 30 (Step S1). Note that the observation data group (y) is the image data shown in FIG. 1. The dictionary matrix (A) has a dictionary matrix corresponding to the observation data group (y). The necessary number of differentiations of the L1 regularization term is two or more.

Next, the smoothing unit setting unit 11 normalizes each of the explanatory variables ($\beta_j$) so that a variance ($\sigma^2_j$) becomes 1 and a mean ($\mu_j$) becomes 1, and sets smoothing units. The smoothing unit indicates a range in which a function value of each of the normalized explanatory variables ($\beta_j$) is smoothed. The smoothing unit setting unit 11 sets a plurality of the smoothing units for each explanatory variable ($\beta_j$) (Step S2).

Next, the convolution unit 12 determines a mollifier function (a polynomial) according to the necessary number of differentiations of the L1 regularization term (Step S3). As described later, the mollifier function of an order n is a function that can be differentiated n−1 times. Thus, when the necessary number of differentiations is $n_d$ ($n_d$ is an integer of two or greater), a mollifier function having an order not less than ($n_d$+1) is determined.

Next, the convolution unit 12 selects one of the plurality of smoothing units set in Step S2 (Step S4). After that, the minimization problem is solved for the smoothing unit selected in Step S4.

Next, the convolution unit 12 converts, for each explanatory variable ($\beta_j$), the function value of each explanatory variable ($\beta_j$) within the range indicated by the smoothing unit selected in Step S4 to a convolution value to be convoluted with the mollifier function determined in Step S3 so as to smooth the function value (Step S5).

As expressed by the equation (4), the L1 regularization term $\Psi(\beta)$ is represented by the product of the sum of the absolute values of the explanatory variables ($\beta_j$) and the regularization variable $\lambda$. For each smoothing unit selected in Step S4, the function value of each explanatory variable ($\beta_j$) is smoothed, to thereby smooth the L1 regularization term $\Psi(\beta)$. Then, the L1 regularization term $\Psi(\beta)$ becomes a convex function that can be differentiated for the necessary number of differentiations. As a result, Newton's method or its variations can be applied to the calculation of the explanatory variable group ($\beta$), as the entire cost function $R(\beta)$ becomes a smoothed convex function.

Thus, the calculation unit 13 applies Newton's method or its variations to calculate the explanatory variable group ($\beta$) that simultaneously minimizes the loss function $f(\beta)$ and the cost function $R(\beta)$ (Step S6). This consequently improves the calculation speed of the explanatory variable group ($\beta$).

Next, the calculation unit 13 estimates the explanatory variable ($\beta_j$) that does not affect the observation data group (y) within the explanatory variable group ($\beta$) calculated in Step S6 to be "0" (Step S7).

The calculation of the minimization problem is thus complete for the smoothing unit selected in Step S4.

Next, the calculation unit 13 decides whether there is an unselected smoothing unit yet to be selected out of the plurality of smoothing units set in Step S2 (Step S8). If there is an unselected smoothing unit (YES in Step S8), the process returns to Step S4 where the convolution unit 12 selects the unselected smoothing unit, and solves the minimization problem for the selected smoothing unit likewise.

On the other hand, if there is no unselected smoothing unit (NO in Step S8), the calculation unit 13 outputs, for each of the plurality of smoothing units set in Step S2, the explanatory variable group ($\beta$) estimated in Step S7 to the outside via the interface (I/F) unit 30 (Step S9).

Accordingly, an external apparatus, which has received the explanatory variable group ($\beta$) for each of the plurality of smoothing units, can obtain, for each of the plurality of smoothing units, the main explanatory variables ($\beta_j$) that affect the observation data group (y) and the number of the main explanatory variables ($\beta_j$).

In FIG. 3, although the explanatory variable group ($\beta$) for each of the plurality of smoothing units is collectively output to the outside in Step S9, it is not limited to this. For example, in Step S7, when the calculation of the minimization problem for the smoothing unit selected in Step S4 is completed, the explanatory variable group ($\beta$) of this smoothing unit may be output.

Hereinafter, the processing of the smoothing unit setting unit 11, the convolution unit 12, and the calculation unit 13 will be described in detail using a specific example.

First, a specific example of the processing of the smoothing unit setting unit 11 will be described.

Figure 4:
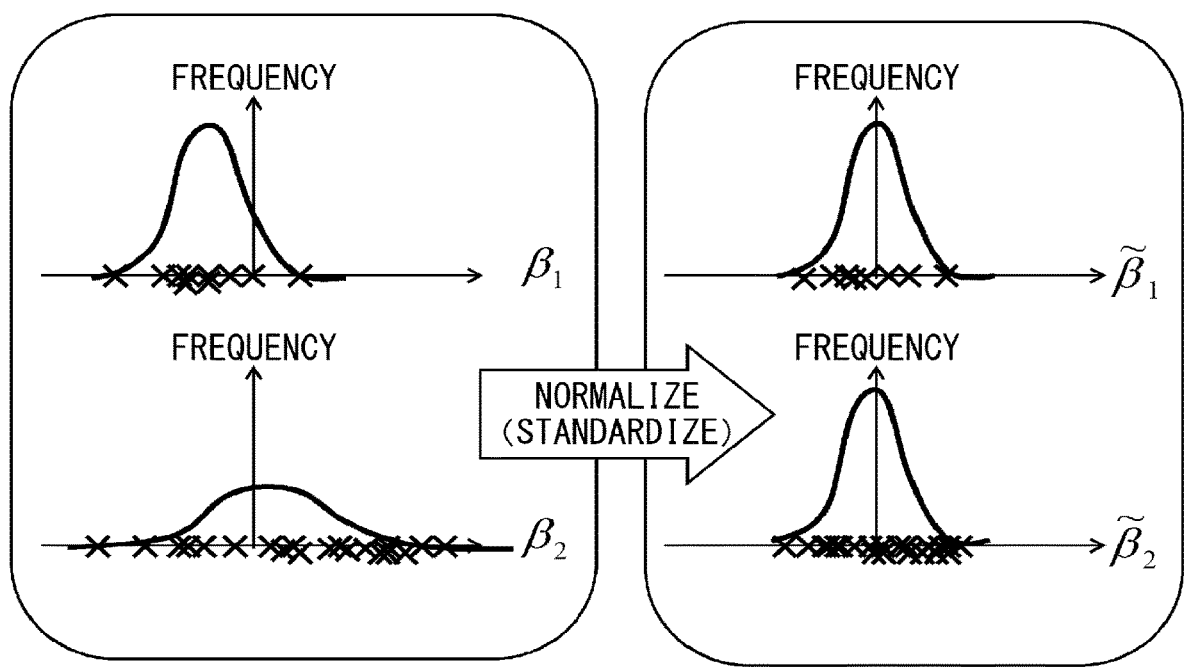
FIG. 4 is a diagram describing a specific example of processing of a smoothing unit setting unit according to the embodiment.
Figure 5:
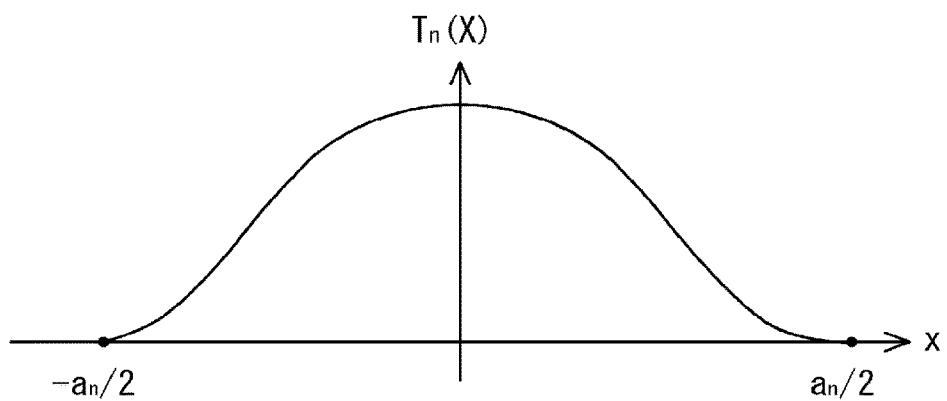
FIG. 5 is a diagram showing an example of a section of a mollifier function.

FIG. 4 is a diagram for describing a specific example of the processing of the smoothing unit setting unit 11 when q=2, where q represents the number of explanatory variables ($\beta_j$). FIG. 5 is a diagram showing an example of a section of the mollifier function.

As shown in FIG. 4, a range in which data pieces are distributed differs for each explanatory variable ($\beta_j$). Therefore, for each explanatory variable ($\beta_j$), the smoothing unit setting unit 11 sets the smoothing unit using statistics of explanatory variable ($\beta_j$) such as a standard deviation ($\sigma_j$), the variance ($\sigma^2_j$), and the mean ($\mu_j$).

To be more specific, firstly the smoothing unit setting unit 11 statistically performs, for each explanatory variable ($\beta_j$), the normalization processing using the following equation (5) so that the variance ($\sigma^2_j$) becomes 1 and the average ($\mu_j$) becomes 1.

$$\tilde{\beta}_j(\beta_j-\mu_j)/\sigma_j \qquad (5)$$

In this equation, $$\tilde{\beta}_j$$

represents the normalized explanatory variable ($\beta_j$).

As shown in FIG. 5, the section of the mollifier function is, for example, $[-a_n/2, a_n/2]$. The smoothing unit setting unit 11 sets, for each explanatory variable ($\beta_j$), a plurality of smoothing units by setting $a_n$, for example, as follows. The following "$a_n$" is an example, and it is not limited to this.

$$a_n = 0.1\ \sigma_j, 0.2\ \sigma_j, \ldots, 0.9\ \sigma_j, 1\ \sigma_j, 2\ \sigma_j, 3\ \sigma_j, \ldots$$

That is, firstly, the smoothing unit setting unit 11 sets $a_n=0.1\ \sigma_j$, and sets, for each explanatory variable ($\beta_j$), the section of the normalized explanatory variable ($\beta_j$) of $[-0.05\ \sigma_j, 0.05\ \sigma_j]$ as the smoothing unit.

Next, the smoothing unit setting unit 11 sets $a_n=0.2\ \sigma_j$ and sets, for each explanatory variable ($\beta_j$), the section of the normalized explanatory variable ($\beta_j$) of $[-0.1\ \sigma_j, 0.1\ \sigma_j]$ as the smoothing unit.

In this way, the smoothing unit setting unit 11 sets the plurality of smoothing units for each explanatory variable ($\beta_j$).

Hereinafter, a specific example of the processing of the convolution unit 12 will be described.

Figure 6:
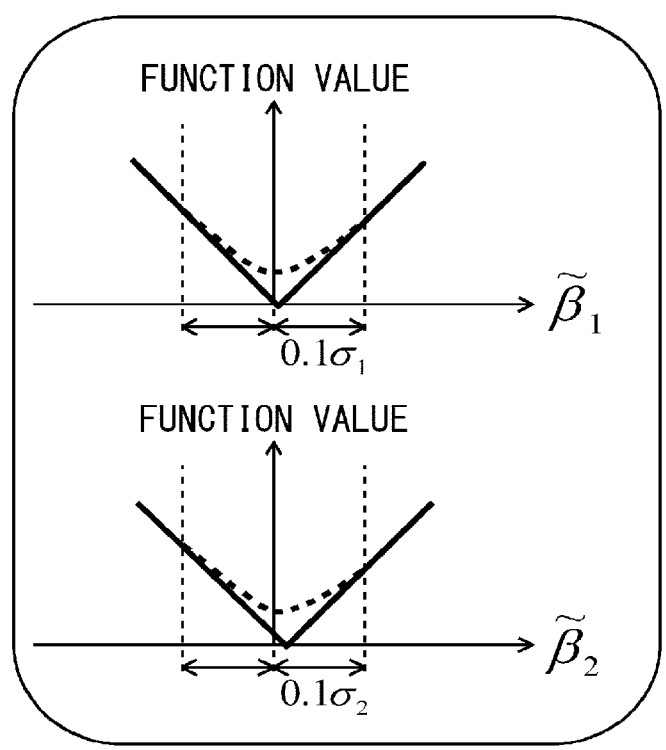
FIG. 6 is a diagram describing a specific example of processing of a convolution unit according to the embodiment.

FIG. 6 is a diagram for describing a specific example of the processing of the convolution unit 12 when q=2, where q represents the number of explanatory variables ($\beta_j$).

The convolution unit 12 selects one of the plurality of smoothing units set by the smoothing unit setting unit 11 and, for each explanatory variable ($\beta_j$), converts each function value of the explanatory variable ($\beta_j$) within the range indicated by the selected smoothing unit to the convolution value to be convoluted with the mollifier function so as to smooth the function value.

For example, when the smoothing unit with $a_n=0.2\ \sigma_j$ is selected, as shown in FIG. 6, the convolution unit 12 matches, for each explanatory variable ($\beta_j$), a section $[-a_n/2, a_n/2]$ of the mollifier function with the section $[-0.1\ \sigma_j, 0.1\ \sigma_j]$ of the function value of the normalized explanatory variable ($\beta_j$), and calculates a composite product of the two sections to smooth the function value. In FIG. 6, the solid lines are waveforms before the smoothing and the broken lines are the waveforms after the smoothing.

The above-mentioned mollifier function will be described in detail.

FIGS. 7A to 7D are diagrams showing an example of the mollifier function $T_n(x)$ in a form of graphs.

The mollifier function is, for example, a Ternary Polynomial function. The ternary polynomial function is a polynomial function that has three regions of a function value increasing region, constant region, and decreasing region. The increasing region and the decreasing region are symmetrical with the constant region interposed therebetween. Details of the ternary polynomial are disclosed in Japanese Unexamined Patent Application Publication No. 2009-053926 already filed by the applicant of the present disclosure and shall be incorporated herein by reference.

The mollifier function $T_n(x)$ (n is 0 or a positive integer) is a function that can be differentiated n−1 times, and has constants $a_0, a_1, \ldots a_n$, and C. Here, d is defined as d=($a_0$, $a_1, \ldots, a_n$, C). Further, C is adjusted in advance so that an integrated value of the mollifier function $T_n(x)$ becomes 1.

Figure 7A:
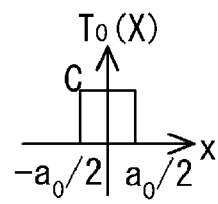
FIGS. 7A to 7D are diagrams showing an example of the mollifier function in a form of graphs.
Figure 7B:
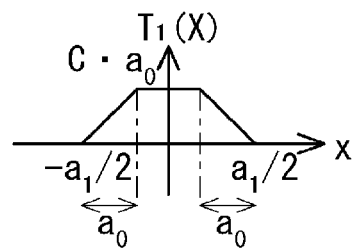
Figure 7C:
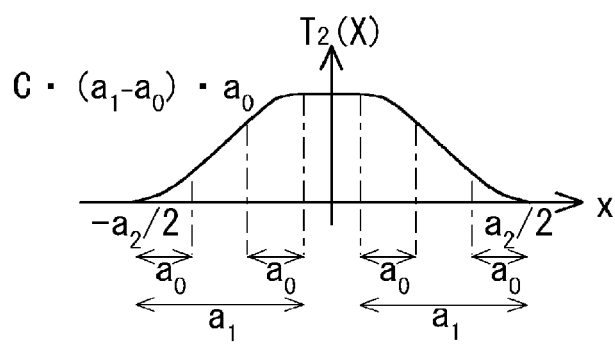
Figure 7D:
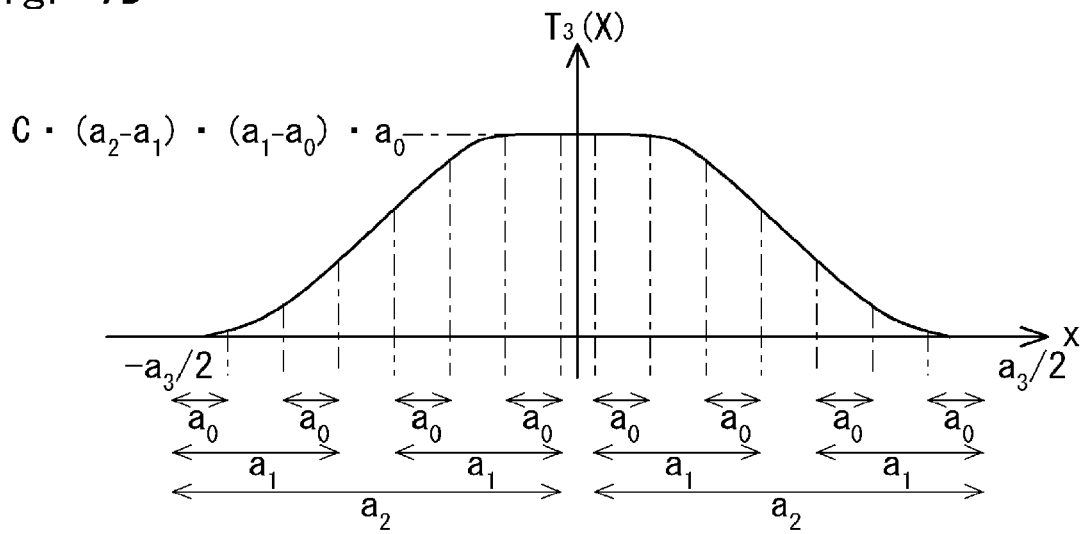

FIG. 7A shows a mollifier function $T_0(x)$ of an order 0 with a rectangular wave profile. FIG. 7B shows a mollifier function $T_1(x)$ of an order 1 with a trapezoidal profile. FIG. 7C shows a mollifier function $T_2(x)$ of an order 2 with a smoothly changing trapezoidal profile. FIG. 7D shows a mollifier function $T_3(x)$ of an order 3 with is a smoothly changing trapezoidal profile.

Figure 8:
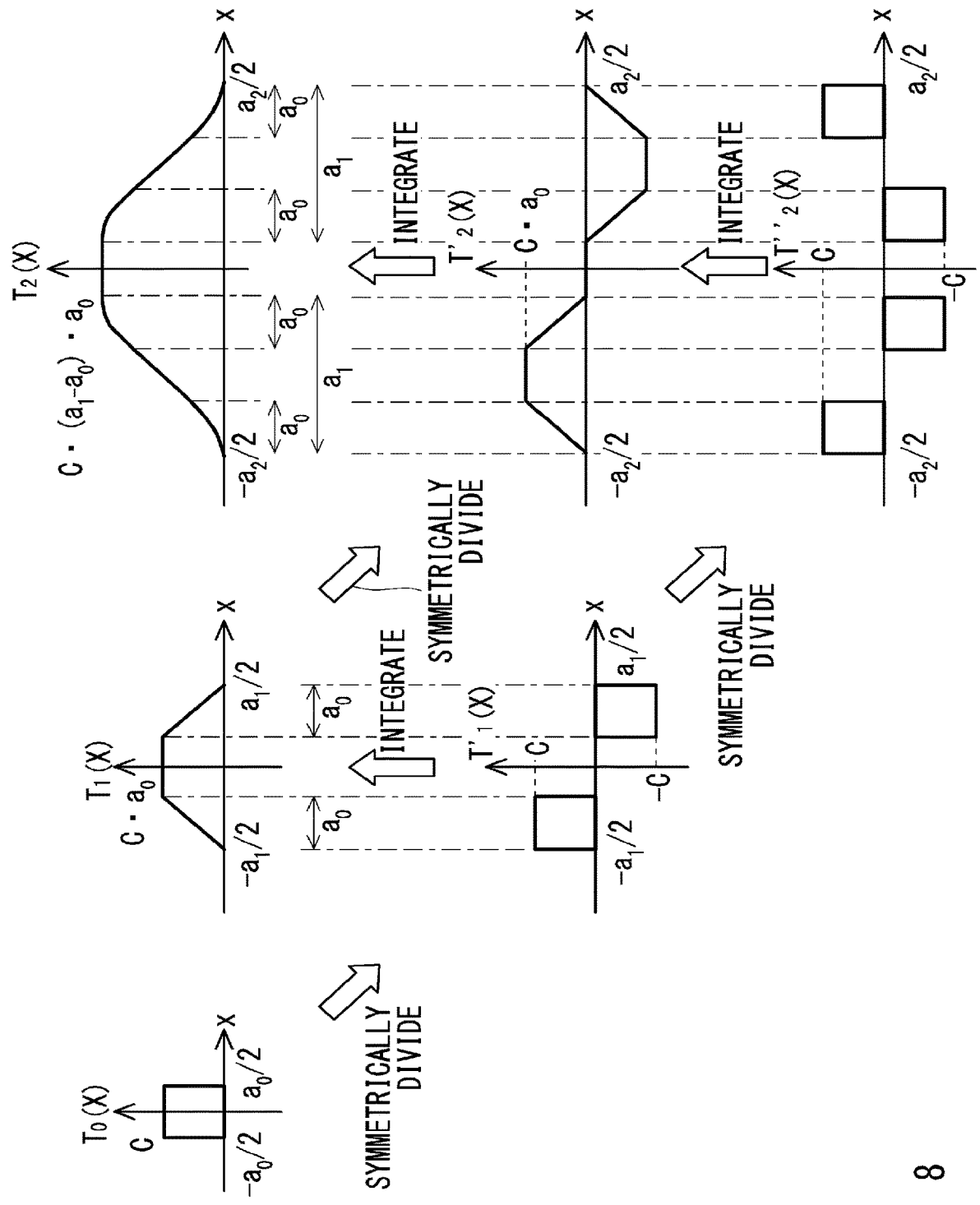
FIG. 8 is a diagram describing an example of a method of generating the mollifier function shown in FIGS. 7A to 7D.

FIG. 8 is a diagram for describing an example of a method of generating the mollifier function $T_n(x)$ shown in FIGS. 7A to 7D.

As shown in FIG. 8, the mollifier function $T_n(x)$ distributes the waveform of $T_n(x)$ symmetrically about the origin of the coordinate system of $T_n(x)$-x to generate $T'_{n+1}(x)$. This $T'_{n|1}(x)$ is integrated to generate $T_{n|1}(x)$ with an order higher by one than that of $T_n(x)$.

For example, when $T_2(x)$ is generated from $T_0(x)$, $T_0(x)$ may be symmetrically divided (symmetrically distributed) and integrated to generate $T_1(x)$, and $T_1(x)$ may be symmetrically divided and integrated to generate $T_2(x)$. Alternatively, after $T_0(x)$ is symmetrically divided, it may be further symmetrically divided to generate $T''_2(x)$, and $T''_2(x)$ may be integrated twice to generate $T_2(x)$.

Next, a method of calculating a composite product of the function value of the explanatory variable ($\beta_j$) and the mollifier function $T_n(x)$ will be described in detail.

The convolution unit 12 calculates a composite product $(\Psi_j)_d(x)$ using the following equation (6) based on $\Psi_j(\beta_j)$ representing the function value of the explanatory variable ($\beta_j$) and the mollifier function $T_n(x)$ of the above-mentioned polynomial to obtain the convolution value.

$$(\Psi_j)_d(x) = \int_{-\infty}^{+\infty} T_n(x-\beta_j)\Psi_j(\beta_j)d\beta_j \tag{6}$$

In this equation, $(\Psi_j)_d(x)$ represents a function that can be differentiated n−1 times and uniformly converge to $(\Psi_j)_d \rightarrow \Psi_j$. The composite product of the absolute value function and the mollifier function (polynomial) like the one above can be calculated by algebraic processing with a small processing load. This achieves high-speed processing.

Next, a specific example of the processing of the calculation unit 13 will be described.

As described above, the convolution unit 12 converts the function value of each explanatory variable ($\beta_j$) to the convolution value to be convolved with the mollifier function so as to smooth the function value. Thus, the L1 regularization term $\Psi(\beta)$ is smoothed and becomes the convex function that can be differentiated for the necessary number of differentiations.

That is, before the smoothing of the L1 regularization term $\Psi(\beta)$, the minimization problem is expressed as a minimization problem of LASSO as in the following equation (7).

$$R(\beta) \|y - A \cdot \beta\|^2 + \varphi(\beta) \tag{7}$$

On the other hand, after the L1 regularization term $\Psi(\beta)$ is smoothed, the minimization problem is expressed as the minimization problem of the composite product LASSO (Convolutional LASSO) as shown in the following equation (8).

$$R(\beta) = \|y - A \cdot \beta\|^2 + \tilde{\varphi}(\beta) \tag{8}$$

In this equation, $$\tilde{\varphi}(\beta)$$

represents the smoothed L1 regularization term $\Psi(\beta)$.

The composite product LASSO is a convex function, and thus Newton's method or its variations may be applied to calculate a global solution.

Accordingly, the calculation unit 13 applies Newton's method or its variations to calculate the explanatory variable group ($\beta$) that simultaneously minimizes $\|y-A-\beta\|^2$ and the cost function R($\beta$).

Next, the calculation unit 13 compares each of the explanatory variables ($\beta_j$) constituting the above-mentioned calculated explanatory variable group ($\beta$) with a corresponding $\varepsilon_j$. That is, the calculation unit 13 compares each of $\beta=(\beta_1, \beta_2)$ with corresponding one of ($\varepsilon_1, \varepsilon_2$). Here, $\varepsilon_j$ is, for example, 0.1 $\sigma_j$. Note that this $\varepsilon_j$ is an example, and it is not limited to this.

Then, if $\beta_j < \varepsilon_j$, the calculation unit 13 decides that the explanatory variable ($\beta_j$) does not affect the observation data group (y), and estimates the explanatory variable ($\beta_j$) to be "0". Further, when $\beta_j \geq \varepsilon_j$, the calculation unit 13 decides that the explanatory variable ($\beta_j$) affects the observation data group (y), and leaves the explanatory variable ($\beta_j$) as it is. For example, if $\beta_1 < \varepsilon_1$ and $\beta_2 \geq \varepsilon_2$, the calculation unit 13 estimates the explanatory variable ($\beta_1$) to be "0" and sets the explanatory variable group ($\beta$)=(0, $\beta_2$). In this case, the main explanatory variable is $\beta_2$, and the number of main explanatory variables is one.

The calculation unit 13 outputs the estimated explanatory variable group ($\beta$) for each of the plurality of smoothing units, which is calculated as described above, to the outside via the interface (I/F) unit 30.

Effect of this Embodiment

Next, an effect of this embodiment will be described. In the sparse learning, the variable group calculation apparatus 1 according to this embodiment, when adding the regularization term and calculating the explanatory variable group ($\beta$), firstly converts the regularization term $\Psi(\beta)$ to the convolution value for the L1 regularization term, which is the regularization term of the L1 norm, and the mollifier function so as to smooth the regularization term $\Psi(\beta)$. After that, the smoothed regularization term $\Psi(\beta)$ is used as the convolution value to calculate the explanatory variable group ($\beta$).

This makes it possible to differentiate the regularization term $\Psi(\beta)$ two or more times while making full use of the characteristics of the L1 norm that enables the explanatory variable group ($\beta$) to be easily narrowed down as the main factor, and Newton's method (the quadratic convergence) or its variations can be applied to the calculation of the explanatory variable group (β). This guarantees the convergence order of the quadratic convergence or greater order convergence, and thus the calculation speed of the explanatory variable group (β) can be improved. Therefore, the explanatory variable group (β) can be easily identified, and the calculation speed can be improved.

Further, the variable group calculation apparatus 1 of this embodiment determines the mollifier function according to the necessary number of differentiations of the L1 regularization term Ψ(β). At this time, when the order of the mollifier function is increased, the acceleration method of the required convergence order can be applied.

Note that the present disclosure is not limited to the above-described embodiment, and can be appropriately changed without departing from the spirit of the present disclosure.

For example, in the above embodiment, the L1 norm is used, but the present disclosure can be applied to when the L1 norm is changed to the Lp norm (p≠2).

In the above embodiment, the image data is used as the observation data group. However, the observation data group is not limited to this, and any large data group (big data) may be used. Examples of the observation data include voice data (conversation data), biometric data, astronomical data, natural language processing data.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An apparatus for sparse machine learning, comprising:
an interface; and
a processor programmed to:
receive an observation data group and a dictionary data group, which are input to the interface from external to the apparatus for sparse machine learning;
convert a regularization term to a convolution value for an L1 norm using an explanatory variable group and a mollifier function;
determine an explanatory variable group that simultaneously minimizes a difference value and a data value,
the difference value being a difference between an added composite value, which is obtained by adding and combining the explanatory variable group and the dictionary data group, and the observation data group, and
the data value including the difference value and the regularization term, which is converted to the convolution value, of the explanatory variable group; and
output the determined explanatory variable group as a sparse machine learning output to a device external to the apparatus for sparse machine learning via the interface.

2. The apparatus for sparse machine learning according to claim 1, wherein the processor is configured to determine the mollifier function according to a necessary number of differentiations of the regularization term, which is input to the interface from external to the apparatus for sparse machine learning.

3. The apparatus for sparse machine learning according to claim 1, wherein the observation data group includes image data, voice data, biometric data, astronomical data, or natural language processing data.

4. The apparatus for sparse machine learning according to claim 1, wherein the observation data group includes image data.

5. The apparatus for sparse machine learning according to claim 1, wherein the observation data group includes voice data.

6. The apparatus for sparse machine learning according to claim 1, wherein the observation data group includes biometric data.

7. The apparatus for sparse machine learning according to claim 1, wherein the observation data group includes astronomical data.

8. The apparatus for sparse machine learning according to claim 1, wherein the observation data group includes natural language processing data.

9. A method for sparse machine learning by an apparatus for sparse machine learning, comprising:
receiving an observation data group and a dictionary data group, which are input to an interface of the apparatus for sparse machine learning from external to the apparatus for sparse machine learning;
converting a regularization term to a convolution value for an L1 norm using an explanatory variable group and a mollifier function;
determining an explanatory variable group that simultaneously minimizes a difference value and a data value,
the difference value being a difference between an added composite value, which is obtained by adding and combining the explanatory variable group and the dictionary data group, and the observation data group, and
the data value including the difference value and a regularization term of the undetermined variable group; and
outputting the determined explanatory variable group as a sparse machine learning output to a device external to the apparatus for sparse machine learning via the interface.

10. The method for sparse machine learning according to claim 9, further comprising determining the mollifier function according to a necessary number of differentiations of the regularization term, which is input to the interface from external to the apparatus for sparse machine learning.

11. A non-transitory computer readable medium storing a sparse machine learning program for causing a computer to execute:
receiving an observation data group and a dictionary data group, which are input to an interface of the computer from external to the computer;
converting a regularization term to a convolution value for an L1 norm using an explanatory variable group and a mollifier function;
determining an explanatory variable group that simultaneously minimizes a difference value and a data value,
the difference value being a difference between an added composite value, which is obtained by adding and combining the explanatory variable group and the dictionary data group, and the observation data group, and
the data value including the difference value and a regularization term of the undetermined variable group; and outputting the determined explanatory variable group as a sparse machine learning output to a device external to the computer via the interface.

12. The non-transitory computer readable medium according to claim 11, the sparse machine learning program causing the computer to execute determining the mollifier function according to a necessary number of differentiations of the regularization term, which is input to the interface from external to the computer.

* * * * *